(12) United States Patent
Chae et al.

(10) Patent No.: US 10,827,500 B2
(45) Date of Patent: Nov. 3, 2020

(54) METHOD AND DEVICE FOR TRANSMITTING AND RECEIVING, BY V2X TERMINAL, SIGNAL IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/562,873

(22) PCT Filed: Apr. 1, 2016

(86) PCT No.: PCT/KR2016/003405
§ 371 (c)(1),
(2) Date: Sep. 28, 2017

(87) PCT Pub. No.: WO2016/159715
PCT Pub. Date: Oct. 6, 2016

(65) Prior Publication Data
US 2018/0115970 A1 Apr. 26, 2018

Related U.S. Application Data

(60) Provisional application No. 62/141,842, filed on Apr. 1, 2015, provisional application No. 62/163,364, filed (Continued)

(51) Int. Cl.
*H04W 72/04* (2009.01)
*H04W 72/02* (2009.01)
(Continued)

(52) U.S. Cl.
CPC .......... *H04W 72/048* (2013.01); *G08G 1/012* (2013.01); *G08G 1/052* (2013.01);
(Continued)

(58) Field of Classification Search
CPC ...... H04L 67/12; H04L 67/125; H04W 28/02; H04W 64/00; H04W 72/02;
(Continued)

(56) References Cited

U.S. PATENT DOCUMENTS

2008/0032712 A1 2/2008 Bemmel et al.
2008/0095163 A1* 4/2008 Chen ....................... H04L 45/16
370/392
(Continued)

FOREIGN PATENT DOCUMENTS

CN 101502132 8/2009
CN 103733237 4/2014
(Continued)

OTHER PUBLICATIONS

PCT International Application No. PCT/KR2016/003405, Written Opinion of the International Searching Authority dated Aug. 30, 2016, 23 pages.
(Continued)

*Primary Examiner* — Khoa Huynh
(74) *Attorney, Agent, or Firm* — Lee Hong Degerman Kang & Waimey

(57) ABSTRACT

One embodiment of the present invention relates to a method by which a terminal transmits and receives a vehicle to everything (V2X) related signal in a wireless communication system, comprising the steps of: selecting a resource pool by comparing at least one piece of measurement information with a resource pool parameter; and transmit-
(Continued)

ting data by using the resource pool, wherein the at least one piece of measurement information is related to a geographical location of the terminal.

13 Claims, 10 Drawing Sheets

Related U.S. Application Data on May 18, 2015, provisional application No. 62/237,591, filed on Oct. 6, 2015.

(51) Int. Cl.

| | | |
|---|---|---|
| G08G 1/01 | (2006.01) | |
| H04W 4/02 | (2018.01) | |
| G08G 1/052 | (2006.01) | |
| G08G 1/056 | (2006.01) | |
| H04W 64/00 | (2009.01) | |
| H04W 28/02 | (2009.01) | |
| H04W 4/40 | (2018.01) | |
| H04L 29/08 | (2006.01) | |

(52) U.S. Cl.
CPC ............ *G08G 1/056* (2013.01); *H04W 4/026* (2013.01); *H04W 72/02* (2013.01); *H04L 67/12* (2013.01); *H04W 4/40* (2018.02); *H04W 28/02* (2013.01); *H04W 64/00* (2013.01)

(58) Field of Classification Search
CPC ......... H04W 72/0446; H04W 72/0453; H04W 72/048; H04W 72/085; H04W 4/026; H04W 4/40; G08G 1/012; G08G 1/052; G08G 1/056

See application file for complete search history.

(56) References Cited

U.S. PATENT DOCUMENTS

| | | | | |
|---|---|---|---|---|
| 2010/0164789 | A1* | 7/2010 | Basnayake | G01S 5/0072 342/357.23 |
| 2011/0124334 | A1* | 5/2011 | Brisebois | H04W 48/16 455/434 |
| 2012/0134336 | A1 | 5/2012 | Nakaya et al. | |
| 2012/0323476 | A1 | 12/2012 | Funabashi | |
| 2013/0013181 | A1 | 1/2013 | Wang et al. | |
| 2013/0083679 | A1 | 4/2013 | Krishnaswamy et al. | |
| 2013/0293394 | A1 | 11/2013 | Rubin et al. | |
| 2015/0016312 | A1* | 1/2015 | Li | H04W 74/0833 370/280 |
| 2015/0065142 | A1* | 3/2015 | Song | H04W 36/00837 455/437 |
| 2015/0296411 | A1* | 10/2015 | Meyer | G08G 1/0112 370/336 |
| 2016/0088510 | A1* | 3/2016 | Berggren | H04W 28/0226 370/230 |
| 2016/0183167 | A1 | 6/2016 | Agiwal et al. | |
| 2016/0212596 | A1* | 7/2016 | Brahmi | H04W 72/0406 |
| 2016/0360464 | A1* | 12/2016 | Han | H04W 36/24 |

FOREIGN PATENT DOCUMENTS

| | | |
|---|---|---|
| CN | 104410975 | 3/2015 |
| CN | 105474726 | 4/2016 |
| CN | 105684508 | 6/2016 |
| JP | 2009545917 | 12/2009 |
| JP | 2011030067 | 2/2011 |
| JP | 2013005186 | 1/2013 |
| JP | 2013080286 | 5/2013 |
| JP | 2014522156 | 8/2014 |
| JP | 2016527841 | 9/2016 |
| WO | 2008019011 | 2/2008 |
| WO | 2013006647 | 1/2013 |
| WO | 2015/021317 | 2/2015 |
| WO | 2015020448 | 2/2015 |
| WO | 2015032436 | 3/2015 |

OTHER PUBLICATIONS

European Patent Office Application Serial No. 16773496.1, Search Report dated Oct. 18, 2018, 10 pages.

Huawei, et al., "Motivation for RAN work on V2V in Rel-13", 3GPP TSG RAN Meeting #66, RP-141918, XP050898625, Dec. 2014, 8 pages.

Qualcomm, "Signaling for ProSe Direct Communication", 3GPP TSG RAN WG2 Meeting #87bis, R2-144543, XP050876719, Oct. 2014, 8 pages.

* cited by examiner (a)

(b)

(a)

(b)

METHOD AND DEVICE FOR TRANSMITTING AND RECEIVING, BY V2X TERMINAL, SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2016/003405, filed on Apr. 1, 2016, which claims the benefit of U.S. Provisional Application No. 62/141,842, filed on Apr. 1, 2015, 62/163,364, filed on May 18, 2015 and 62/237,591, filed on Oct. 6, 2015, the contents of which are all hereby incorporated by reference herein in their entirety.

TECHNICAL FIELD

The following description relates to a wireless communication system and, more particularly, to a method of, at a user equipment (UE), transmitting and receiving a vehicle to everything (V2X) related signal, and a device therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

D2D communication is a communication scheme in which a direct link is established between User Equipments (UEs) and the UEs exchange voice and data directly with each other without intervention of an evolved Node B (eNB). D2D communication may cover UE-to-UE communication and peer-to-peer communication. In addition, D2D communication may find its applications in Machine-to-Machine (M2M) communication and Machine Type Communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, the overhead of a network may be reduced. Further, it is expected that the introduction of D2D communication will reduce the power consumption of devices participating in D2D communication, increase data transmission rates, increase the accommodation capability of a network, distribute load, and extend cell coverage.

DISCLOSURE

Technical Problem

An object of the present invention is to provide a method of transmitting and receiving a signal for transmitting data after selecting a resource pool in consideration of position information of a vehicle to everything (V2X) UE.

The technical problems solved by the present invention are not limited to the above technical problems and other technical problems which are not described herein will become apparent to those skilled in the art from the following description.

Technical Solution

The object of the present invention can be achieved by providing a method of, at a user equipment (UE), transmitting and receiving a vehicle to everything (V2X) related signal in a wireless communication system including selecting a resource pool by comparing one or more measurement information with resource pool parameters and transmitting data using the resource pool, wherein the one or more measurement information are related to a geographical position of the UE.

In another aspect of the present invention, provided herein is a user equipment (UE) device for transmitting and receiving a vehicle to everything (V2X) related signal in a wireless communication system including a transmission module and a reception module and a processor, wherein the processor selecting a resource pool by comparing one or more measurement information with resource pool parameters and transmits data using the resource pool, and wherein the one or more measurement information are related to a geographical position of the UE.

A range of a value may be configured in the resource pool according to parameters related to the geographical position of the UE.

One or more of a transmission period, a transmission probability and a repetition number may be configured in the resource pool.

The one or more measurement information may include movement direction information of the UE.

The movement direction information of the UE may be measured by a sensor or a global positioning system (GPS) of the UE.

The movement direction information of the UE may be derived from change in cell ID.

The cell ID may be identifier information for identifying a road side unit (RSU).

The one or more measurement information may be an average of movement speeds of UEs located near the UE.

The one or more measurement information may include mobility of the UE.

The mobility may be measured by a speed sensor of the UE.

The mobility may be determined by the number of times of detection of road side units (RSUs) each having a predetermined reference signal received power (RSRP) or more.

The UE transmits the data on predetermined time-frequency resources of the resource pool.

The UE may select time-frequency resources from the resource pool and transmits the data.

Advantageous Effects

According to the present invention, since a resource region is divided according to the traveling direction or mobility of a UE, it is possible to reduce ICI.

The effects which can be obtained by the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Figure 1:
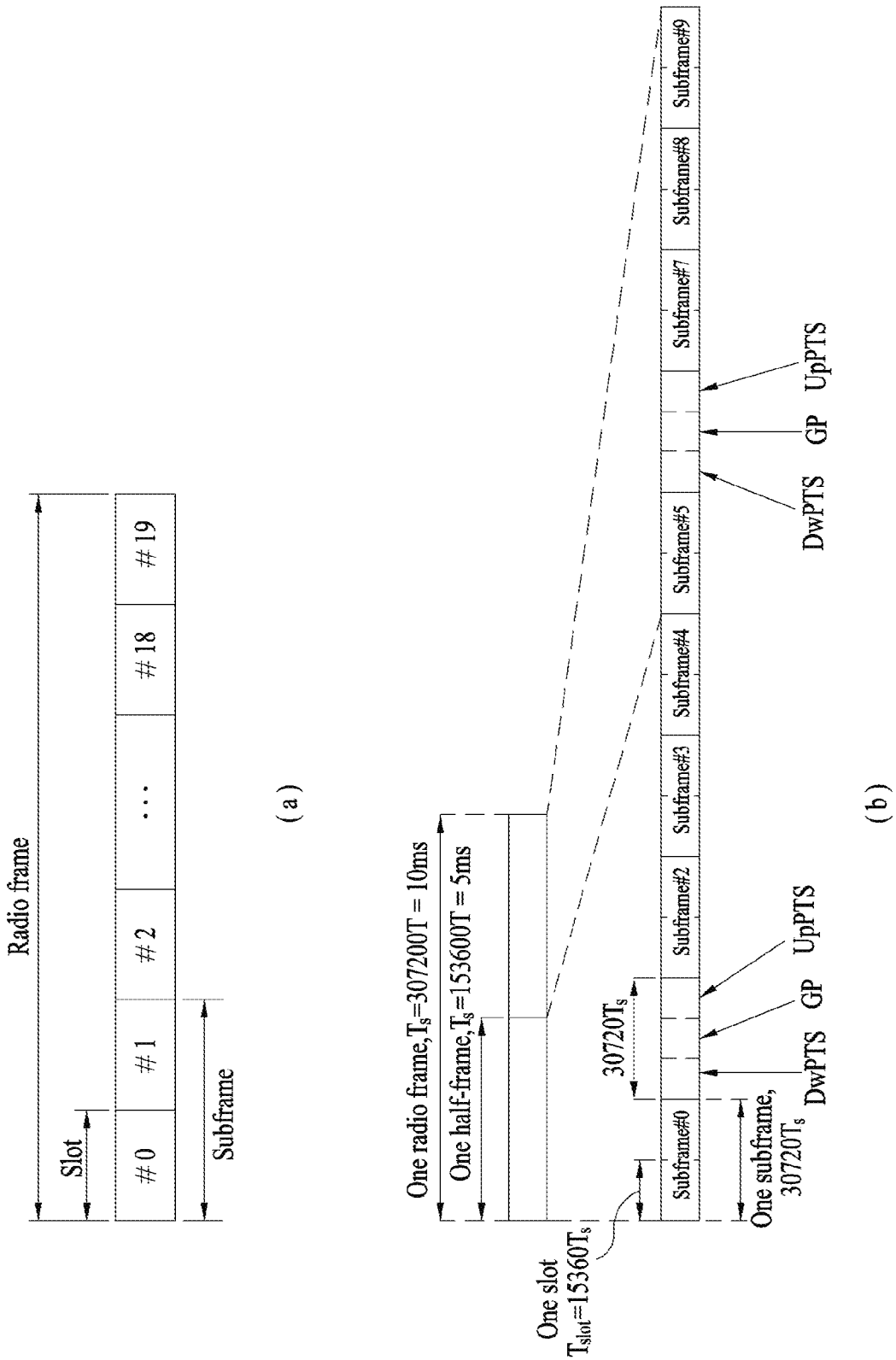
FIG. 1 is a diagram for a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

The term "cell", as used herein, may be applied to transmission and reception points such as a base station (eNB), sector, remote radio head (RRH) and relay, and may also be extensively used by a specific transmission/reception point to distinguish between component carriers.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless Packet communication system, uplink and/or downlink data Packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
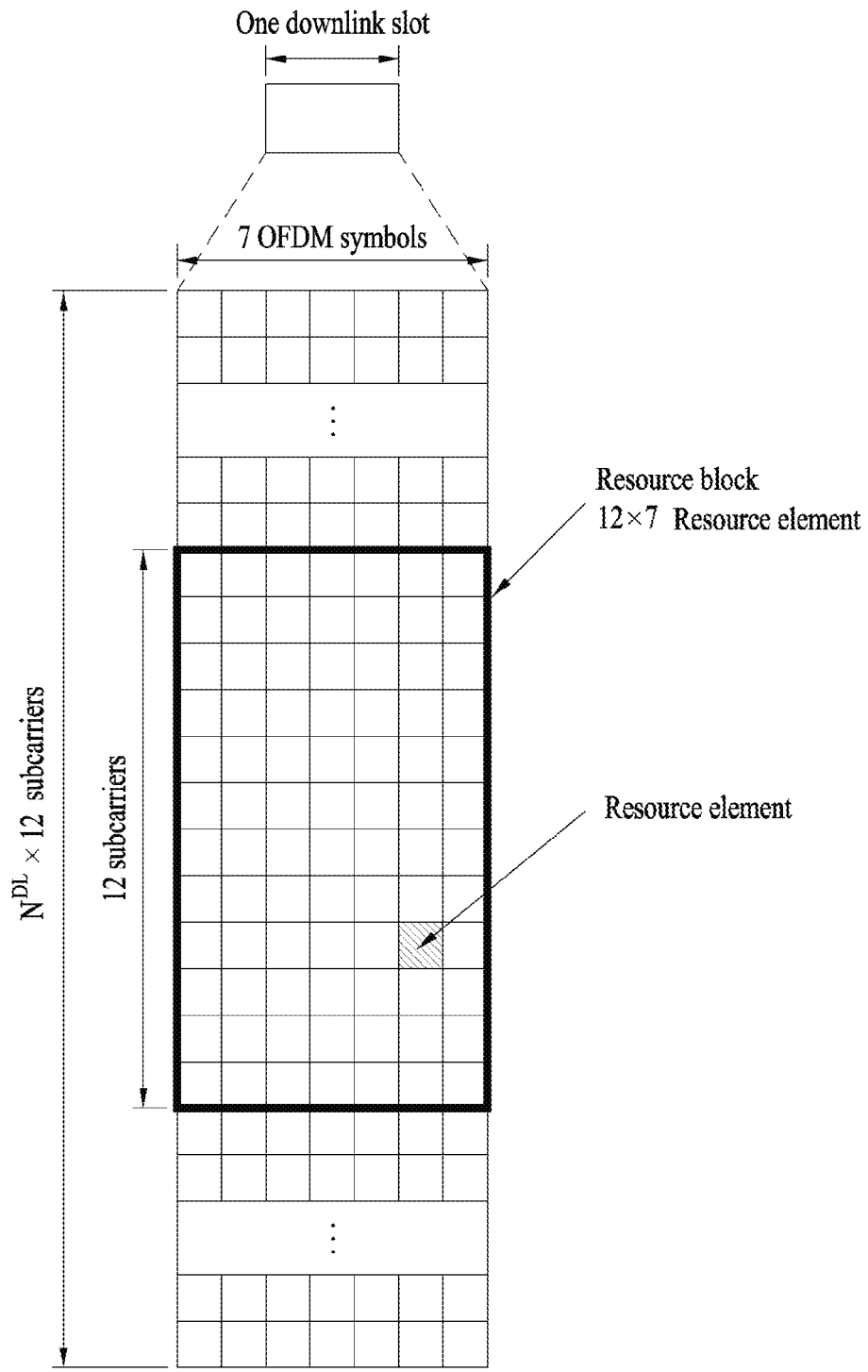
FIG. 2 is a diagram for a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
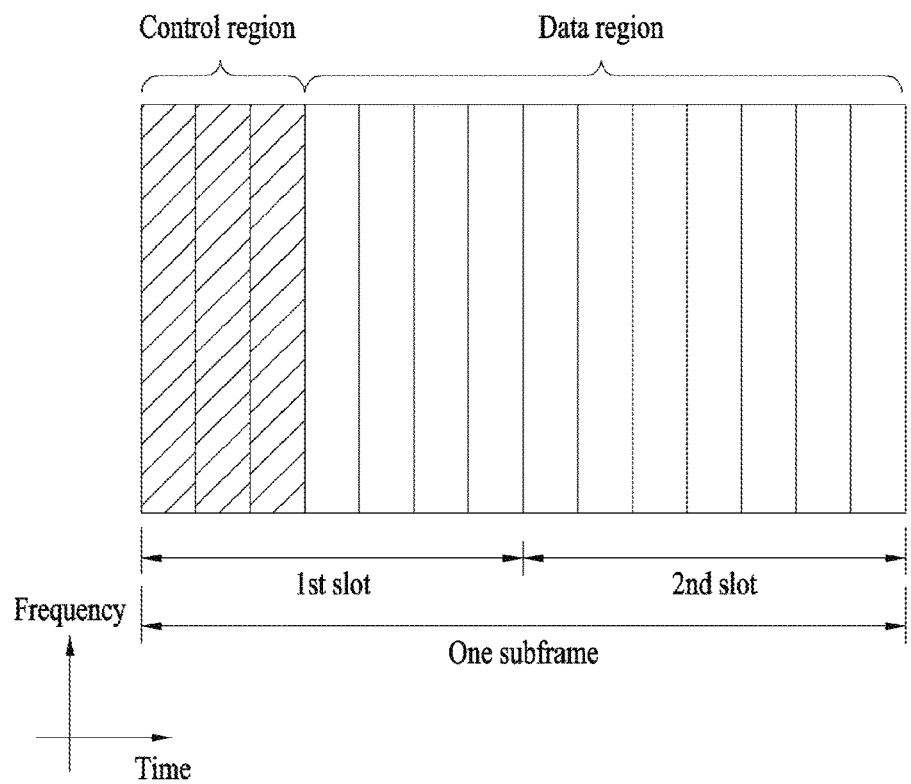
FIG. 3 is a diagram for a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
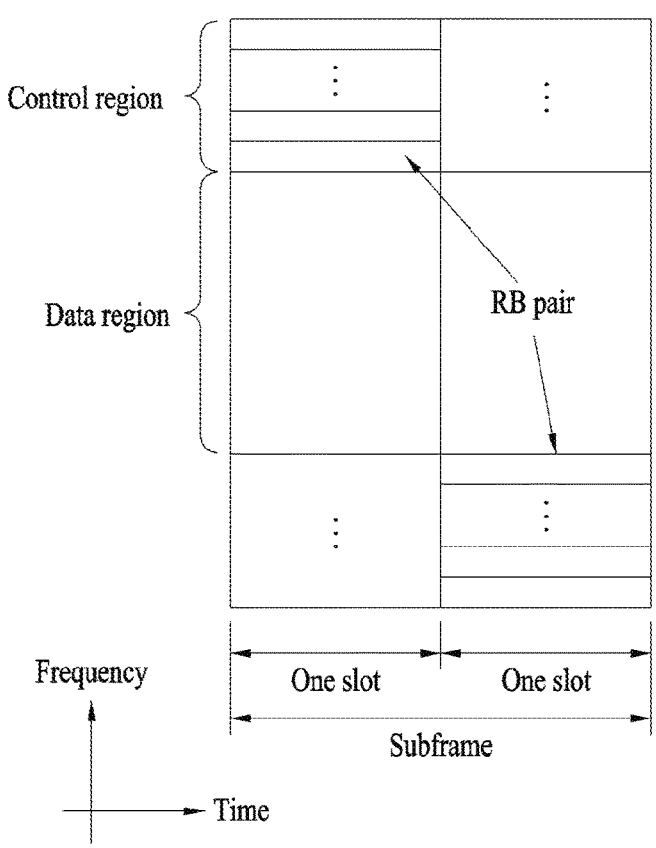
FIG. 4 is a diagram for a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a Packet is transmitted on a radio channel. In view of the nature of the radio channel, the Packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

Figure 5:
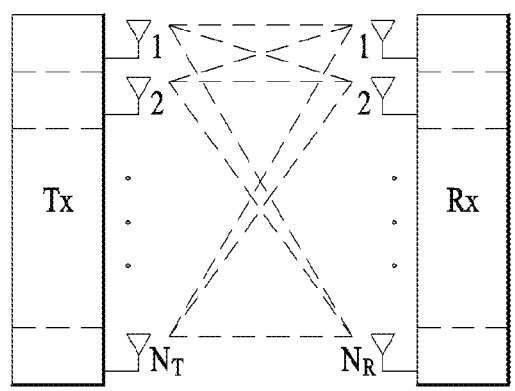
FIG. 5 is a diagram for a configuration of a wireless communication system having multiple antennas.
Figure 5:
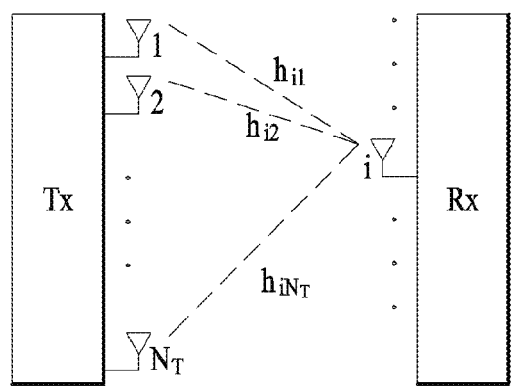

FIG. 5 is a diagram illustrating a configuration of a wireless communication system having multiple antennas.

As shown in FIG. 5(a), if the number of transmit antennas is increased to NT and the number of receive antennas is increased to NR, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses 4 transmit antennas and 4 receive antennas, a transmission rate 4 times higher than that of a single antenna system can be obtained. Since this theoretical capacity increase of the MIMO system has been proved in the middle of 90's, many ongoing efforts are made to various techniques to substantially improve a data transmission rate. In addition, these techniques are already adopted in part as standards for various wireless communications such as 3G mobile communication, next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are NT transmit antennas and NR receive antennas.

Regarding a transmitted signal, if there are NT transmit antennas, the maximum number of pieces of information that can be transmitted is NT. Hence, the transmission information can be represented as shown in Equation 2.

$$s = [s_1, s_2, \ldots, s_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring NT transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

In Equation 5, $w_{ij}$ denotes a weight between an $i^{th}$ transmit antenna and $j^{th}$ information. W is also called a precoding matrix.

If the NR receive antennas are present, respective received signals $y_1, y_2, \ldots, y_{N_R}$ of the antennas can be expressed as follows.

$$y = [y_1, y_2, \ldots, y_{N_R}]^T \quad \text{[Equation 6]}$$

If channels are modeled in the MIMO wireless communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

FIG. 5(b) is a diagram illustrating channels from the NT transmit antennas to the receive antenna i. The channels may be combined and expressed in the form of a vector and a matrix. In FIG. 5(b), the channels from the NT transmit antennas to the receive antenna i can be expressed as follows.

$$h_i^T = [h_{i1}, h_{i2}, \ldots, h_{iN_T}] \quad \text{[Equation 7]}$$

Accordingly, all channels from the NT transmit antennas to the NR receive antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \quad \text{[Equation 8]}$$

An AWGN (Additive White Gaussian Noise) is added to the actual channels after a channel matrix H. The AWGN $n_1$, $n_2$, ..., $n_{N_R}$ respectively added to the NR receive antennas can be expressed as follows.

$$n = [n_1, n_2, \ldots, n_{S_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} \begin{bmatrix} n_1 \\ n_2 \\ \vdots \\ n_i \\ \vdots \\ n_{N_R} \end{bmatrix} = \quad \text{[Equation 10]}$$

$$Hx + n$$

Meanwhile, the number of rows and columns of the channel matrix H indicating the channel state is determined by the number of transmit and receive antennas. The number of rows of the channel matrix H is equal to the number NR of receive antennas and the number of columns thereof is equal to the number NR of transmit antennas. That is, the channel matrix H is an NR×NT matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting Inter-Cell Interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a Synchronization Reference Node (SRN, also referred to as a synchronization source)) may transmit a D2D Synchronization Signal (D2DSS) and the remaining UEs may transmit and receive signals in synchronization with the D2DSS.

Figure 6:
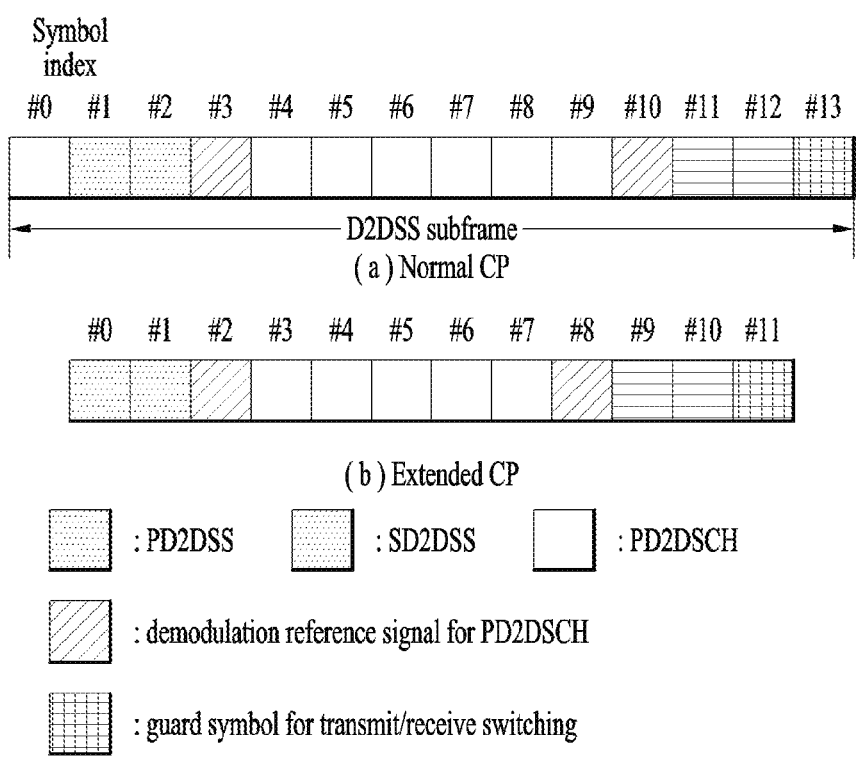
FIG. 6 is a diagram for a subframe in which a D2D synchronization signal is transmitted.

D2DSSs may include a Primary D2DSS (PD2DSS) or a Primary Sidelink Synchronization Signal (PSSS) and a Secondary D2DSS (SD2DSS) or a Secondary Sidelink Synchronization Signal (SSSS). The PD2DSS may be configured to have a similar/modified/repeated structure of a Zadoff-chu sequence of a predetermined length or a Primary Synchronization Signal (PSS). Unlike a DL PSS, the PD2DSS may use a different Zadoff-chu root index (e.g., 26, 37). And, the SD2DSS may be configured to have a similar/modified/repeated structure of an M-sequence or a Secondary Synchronization Signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A Physical D2D Synchronization Channel (PD2DSCH) may be a (broadcast) channel carrying basic (system) information that a UE should first obtain before D2D signal transmission and reception (e.g., D2DSS-related information, a Duplex Mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
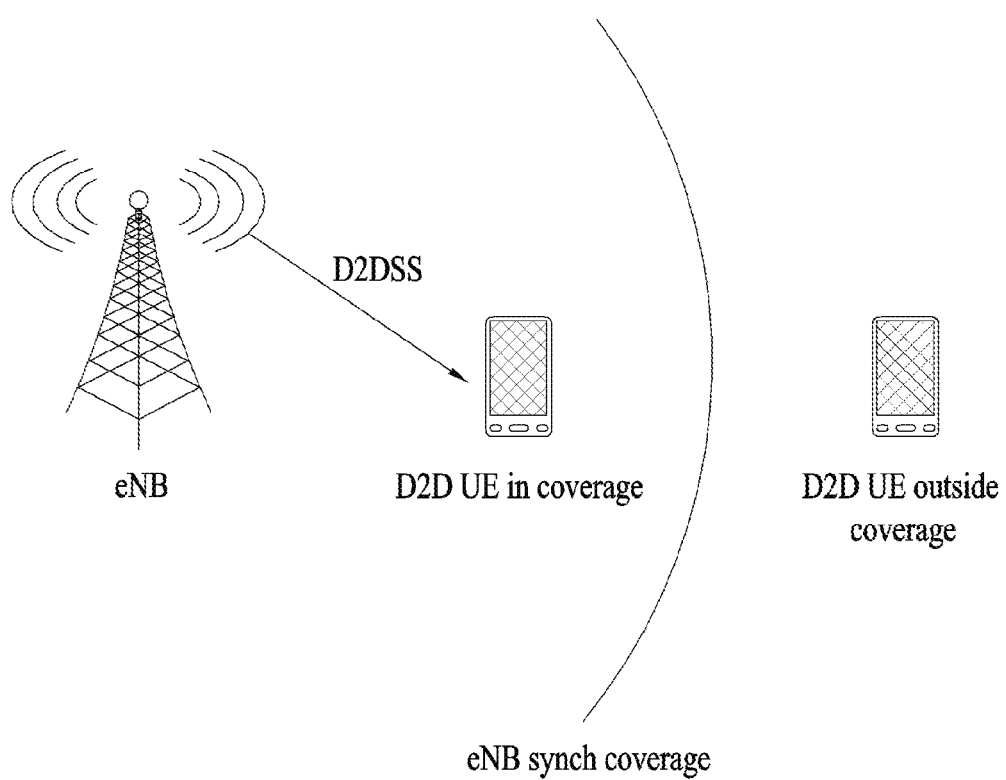
FIG. 7 is a diagram for explaining relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct Amplify-and-Forward (AF)-relay of an SS transmitted by an eNB. As the D2DSS is relayed, an in-coverage UE may communicate directly with an out-of-coverage UE.

D2D Resource Pool

Figure 8:
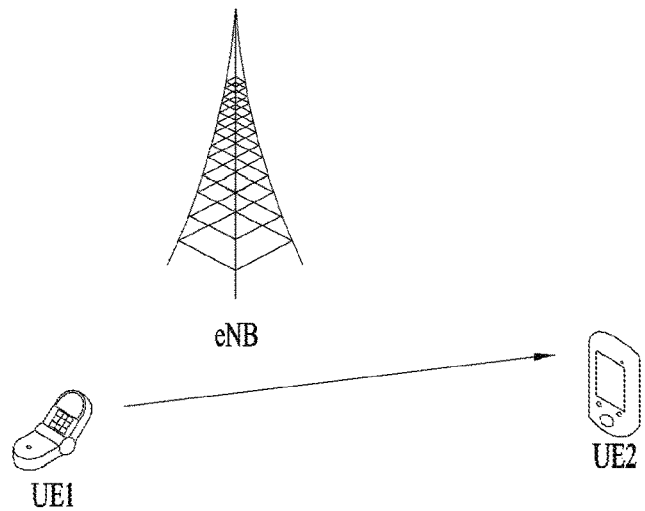
FIG. 8 is a diagram for an example of a D2D resource pool for performing D2D communication.
Figure 8:
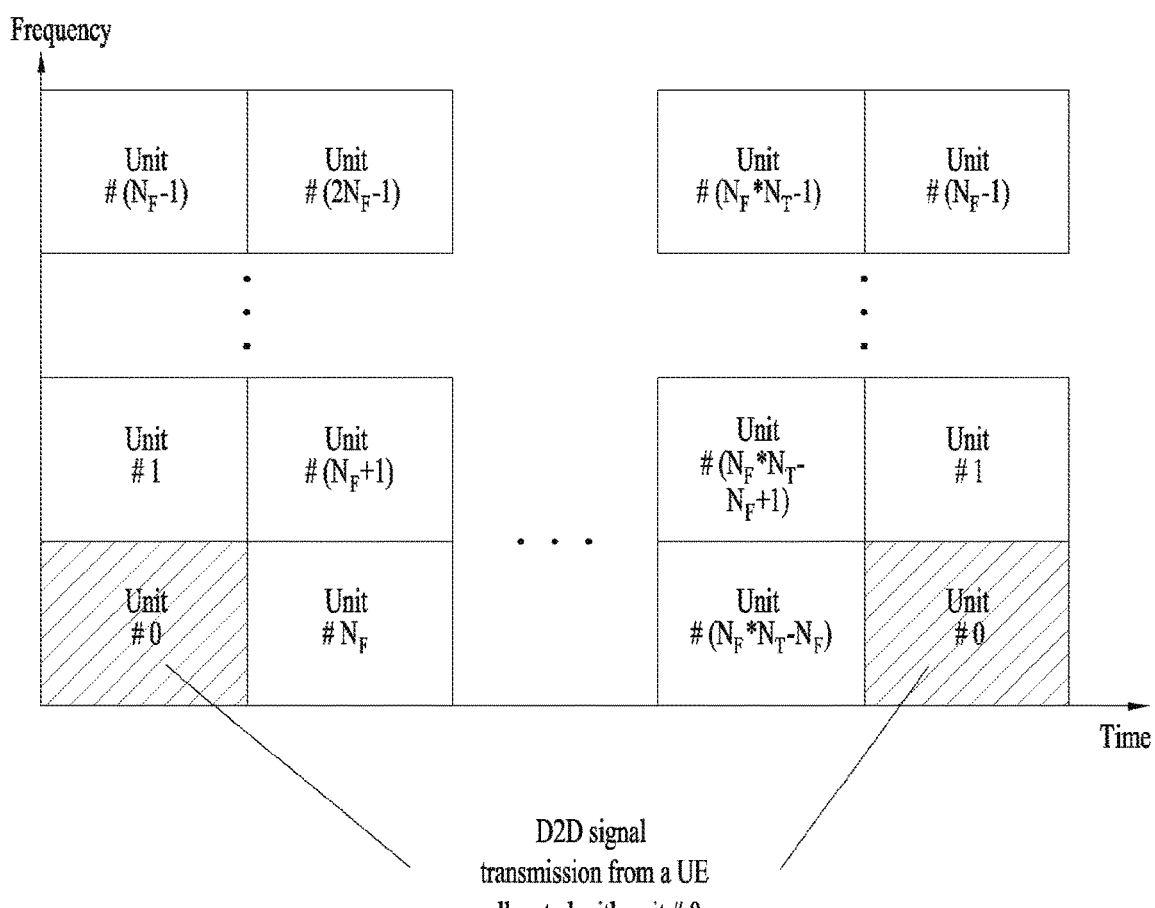

FIG. 8 shows an example of a UE1, a UE2 and a resource pool used by the UE1 and the UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. A UE2 corresponding to a reception UE receives a configuration of a resource pool in which the UE1 is able to transmit a signal and detects a signal of the UE1 in the resource pool. In this case, if the UE1 is located at the inside of coverage of an eNB, the eNB can inform the UE1 of the resource pool. If the UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include SA (scheduling assignment), a D2D data channel, and a discovery channel. The SA may correspond to a signal including information on a resource position of a D2D data channel, information on MCS (modulation and coding scheme) necessary for modulating and demodulating a data channel, information on a MIMO transmission scheme, information on TA (timing advance), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a PSCCH (physical sidelink control channel). The D2D data channel (or, PSSCH (physical sidelink shared channel)) corresponds to a resource pool used by a transmission UE to transmit user data. If an SA and a D2D data are transmitted in a manner of being multiplexed in an identical resource unit, D2D data channel except SA information can be transmitted only in a resource pool for the D2D data channel. In other word, resource elements (REs), which are used to transmit SA information in a specific resource unit of an SA resource pool, can also be used for transmitting D2D data in a D2D data channel resource pool. The discovery channel may correspond to a resource pool for a message that enables a neighboring UE to discover transmission UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmission UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmission UE is referred to as a mode 1. If a transmission resource region is configured in advance or an eNB designates the transmission resource region and a UE directly selects a transmission resource from the transmission resource region, it is referred to as a mode 2. In case of performing D2D discovery, if an eNB directly indicates a resource, it is referred to as a type 2. If a UE directly selects a transmission resource from a predetermined resource region or a resource region indicated by the eNB, it is referred to as a type 1.

Transmission and Reception of SA

A mode 1 UE can transmit an SA signal (or, a D2D control signal, SCI (sidelink control information)) via a resource configured by an eNB. A mode 2 UE receives a configured resource to be used for D2D transmission. The mode 2 UE can transmit SA by selecting a time frequency resource from the configured resource.

Figure 9:
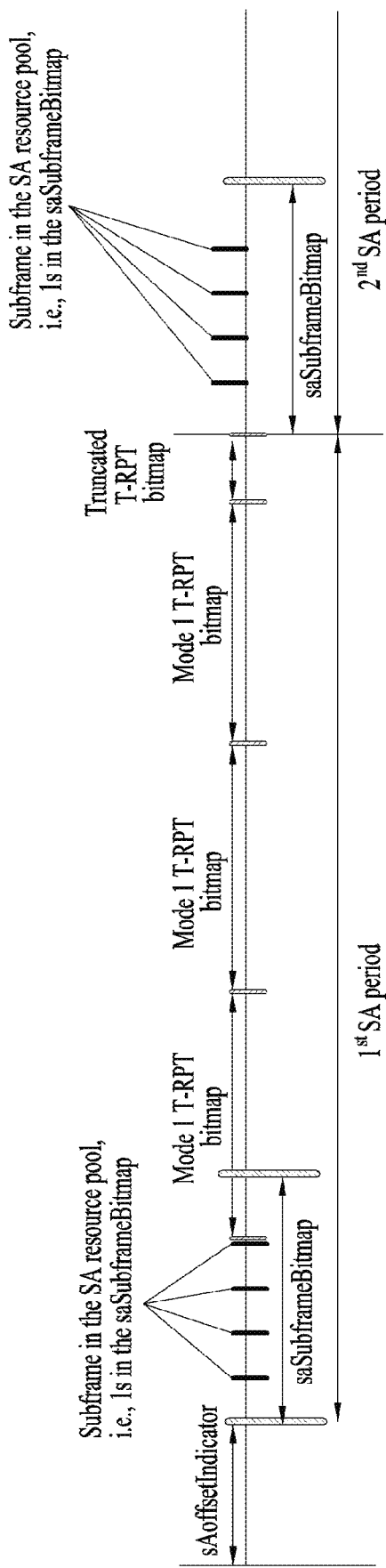
FIG. 9 is a diagram for explaining an SA period.

The SA period can be defined as FIG. 9. Referring to FIG. 9, a first SA period can start at a subframe apart from a specific system frame as much as a prescribed offset (SAOffsetIndicator) indicated by higher layer signaling. Each SA period can include an SA resource pool and a subframe pool for transmitting D2D data. The SA resource pool can include subframes ranging from a first subframe of an SA period to the last subframe among subframes indicated by a subframe bitmap (saSubframeBitmap) to transmit SA. In case of mode 1, T-RPT (time-resource pattern for transmission) is applied to the resource pool for transmitting D2D data to determine a subframe in which an actual data is transmitted. As shown in the drawing, if the number of subframes included in an SA period except the SA resource pool is greater than the number of T-RPT bits, the T-RPT can be repeatedly applied and the lastly applied T-RPT can be applied in a manner of being truncated as many as the number of remaining subframes. SA may indicate the transmission position of data in the form of T-RPT or using another explicit method. For example, a transmission start position of data, the number of repetitions, etc. may be indicated. More generally, SA is a transmission channel indicating time and frequency positions of transmission resources of data and including supplementary information necessary for data decoding. Such an SA resource pool may be separated from a data pool or may partially overlap a data pool to partially share a data domain.

In addition, the data pool and the SA resource pool may not be separated in the time domain but may be separated in the frequency domain.

Meanwhile, V2X communication has been discussed in association with D2D communication. V2X may include V2V between vehicle UEs, V2P between a vehicle and another type of UE, and V2I between a vehicle and a roadside unit (RSU). Hereinafter, embodiments of the present invention of a resource allocation method related to V2X based on the above description will be described. In the following description, a UE may be a vehicle or a UE attached to a vehicle.

Embodiment

A UE according to an embodiment of the present invention may select a resource pool by comparing one or more measurement information with resource pool parameters and transmit data using the resource pool. The UE may transmit data on predetermined time-frequency resources of the resource pool or select time-frequency resources from the resource pool to transmit data.

Here, one or more measurement information may be related to a geographical position of the UE. The UE may select a resource pool from among a plurality of resource pools, and, in the resource pools, the range of a value may be configured according to parameters related to the geographical position of the UE. The UE may compare the measurement information related to the geographical position with the range of the parameter values configured in the resource pool and select a resource pool suiting a condition. In addition, in the resource pool, one or more of a transmission period, a transmission probability and a repetition number may be configured. In this case, when the UE selects a specific resource pool, transmission may be performed according to the transmission period, the transmission probability and the repetition number configured in the resource pool. The transmission period, the transmission probability and the repetition number may be forcibly set or recommended (selected by the UE) to the UE upon selecting the resource pool.

Figure 10:
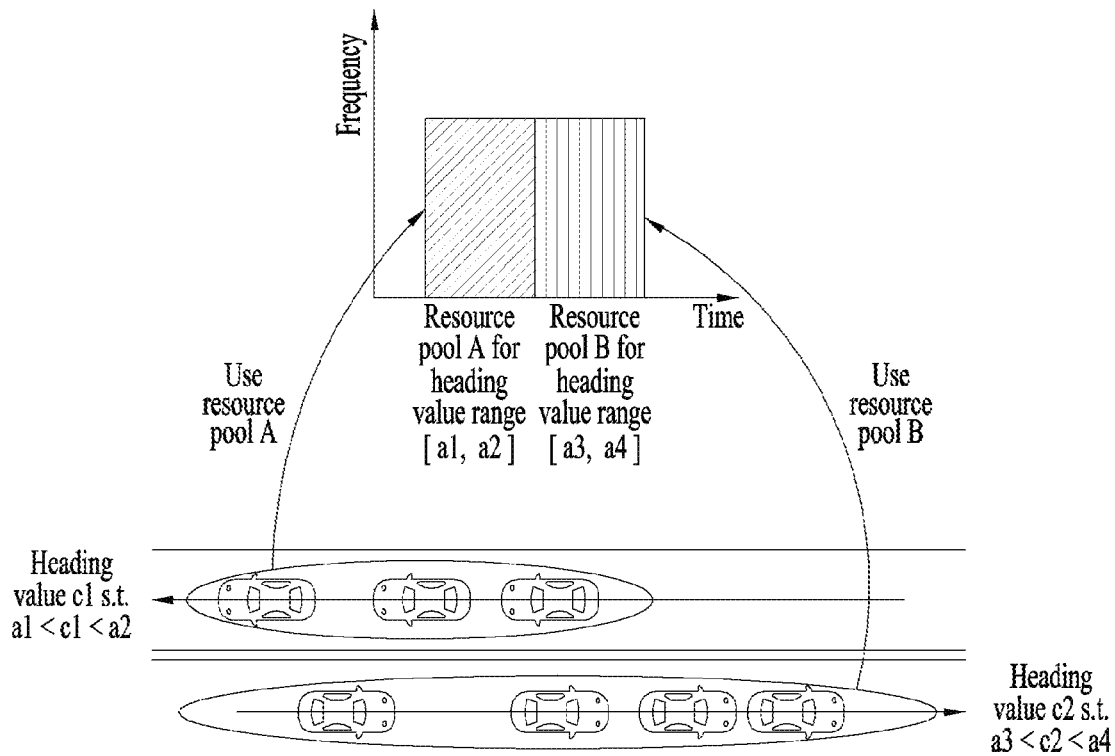
FIGS. 10 and 11 are diagrams illustrating embodiments of the present invention.

In the above description, one or more measurement information may include movement direction information of the UE. In this case, the resource pool may be pre-configured according to movement directions. For example, in a road environment shown in FIG. 10, since the movement direction information of the UE is of two types, at least two types of resource pools may be configured according to direction. In addition, a threshold of a heading value may be configured in the resource pool. If the number of resource pools per direction is 1, as shown in FIG. 10, UEs having the same movement direction (that is, UEs traveling in the same direction) may use the same resource (resource pool A) and UEs traveling in a different direction may use a different resource pool B. Although the resource pools are divided on a time axis in the example of FIG. 10, this is merely an example and the resource pools may be divided on a frequency axis or a time-frequency axis.

The movement direction information of the UE may be measured by a sensor or a global positioning system (GPS) of the UE. The method of acquiring/measuring the movement direction information is not limited thereto and various methods capable of obtaining a heading value may be used. That is, if the movement direction of the UE is checked using any method, a resource region is divided and used by UEs having different movement directions using the value of the movement direction. At this time, resources may be divided using three methods, that is, according to time, frequency or time/frequency. The embodiment of the present invention may include the three methods.

As another method of checking the movement direction information of the UE, the heading value may be implicitly checked by tracking the ID of an RSU or a peripheral cell. That is, the movement direction information of the UE may be derived from change in cell ID. Here, a cell ID may be identifier information for identifying a road side unit (RSU). When it is difficult for the UE to check the heading value or if the heading value is not directly used to select the resource, different resource pools may be used between UEs, the cell IDs of which are differently changed, that is, UEs moving in different directions, by tracking change in cell ID upon inter-cell handover of a UE (handover in the case of an RRC connected UE and cell reselection in an RRC idle UE). To this end, a network may configure change in cell ID or a change range of a sequence or vector generated by change in cell ID or equivalent information thereof when the UE moves, according to resource pool. For example, a resource pool used by a UE, a cell ID of which is changed in order of A, B and C in a specific region and a resource pool used by a UE, a cell ID of which is changed in order of C, B and A, may be distinguished/divided. To this end, a network may configure a cell ID change value, a difference, a range of a vector value between cell IDs, etc. according to resource pool such that UE may distinguish between a resource pool used when the detected cell ID is changed in order of C to A and a resource pool used when the detected cell ID is changed in order of A to C. As another example, the network may configure the order of detected cell IDs having a predetermined threshold or more within a predetermined period according to resource pool.

If an RSU is mounted on a road, a UE may track the ID of the detected RSU to estimate mobility and direction of the UE. At this time, the network may signal change in ID of the RSU according to resource pool. In addition, a UE moving on a specific road may report the order of the detected cell IDs or the order of RSU IDs to the network through a physical layer signal or a higher layer signal along with (or separately from) a heading value or the direction of the road, in order to estimate cell ID/RSU ID change statistics according to heading value on the specific road. The network may configure the change value of the cell ID/RSU ID per resource pool based on information fed back from the UE.

The heading value or range may be directly configured per resource pool or several resource pools may be configured and the usage index of the resource pool according to heading may be configured by the network. In this case, a method of, at a UE, selecting a usage index according to heading value and selecting a resource pool according to the usage index selected by the UE is proposed. In this method, the heading value is not explicitly used to select the resource pool but is replaced by the usage index per resource pool to implicitly divide resource pools according to the heading value.

As described above, if the movement direction information is used as a criterion for dividing resource pools and UEs having the same movement direction use the same resource pools, the relative speeds of the UEs may decrease, thus decreasing inter carrier interference (ICI). In addition, in V2X, a necessary service may be changed depending on whether the movement directions are the same or different. For example, on a road in which information about an opposite lane is not important, such as a guardrail or tunnel, decoding of information transmitted by a UE in the opposite lane may be omitted. In addition, a traffic jam may occur in a specific direction or when the number of UEs may rapidly increases due to traffic jam in an opposite lane. Such a problem may be solved. If a shared pool is used regardless of direction, D2D signal transmission and reception in a specific direction may not be smoothly performed due to traffic jam in an opposite lane.

In addition, one or more measurement information may include mobility of a UE. That is, the resource pool may be divided according to mobility of the UE. To this end, a network may configure an upper or lower limit or average of mobility according to resource pool. That is, the UE may check mobility thereof and transmit a signal only in a resource pool satisfying a mobility condition configured by the network. In this case, a resource region may be divided between a UE having low mobility and a UE having high mobility, thereby preventing the UE having low mobility from experiencing ICI from the UE having high mobility.

Mobility may be measured by the speed sensor of the UE. If a vehicle and a wireless UE are linked, a resource region in which the wireless UE of the vehicle transmits a signal may be selected using information acquired by the speed sensor of the vehicle. More specifically, a network or a UE knows positions of RSUs, an interval between the RSUs, an average distance between the RSUs on a road or density of RSUs or a network knows and signals the information to the UE through a physical layer signal or a higher layer signal. The UE may count the number of RSUs having a predetermined reference signal received power (RSRP) or more per time or the number of times of handover based on the information to estimate an average speed and divide and use a resource region according to mobility.

In addition, mobility may be determined according to the number of RSUs having the predetermined RSRP or more. To this end, the average distance between RSUs or the positions of the RSUs may be signaled to the UE through a physical layer signal or a higher layer signal. Alternatively, mobility may be checked by counting the average number of times of handover of the UE.

As another example, resource pools may be differently set according to a lane in which a UE travels. For example, if four lanes are present and a left-turn signal and a left-turn lane are present, a relative speed may be decreased before signal change. Alternatively, if only a specific vehicle travels in a specific lane such as a public transportation only lane, a signal transmitted by a vehicle traveling in the specific lane may be transmitted in a separate resource pool, differently from a signal transmitted by vehicles traveling in the other lane. Such lane information may be acquired by the UE using position estimation technology or the lane of the UE may be checked by the network through network-based position estimation technology and signaled to the UE.

Figure 11:
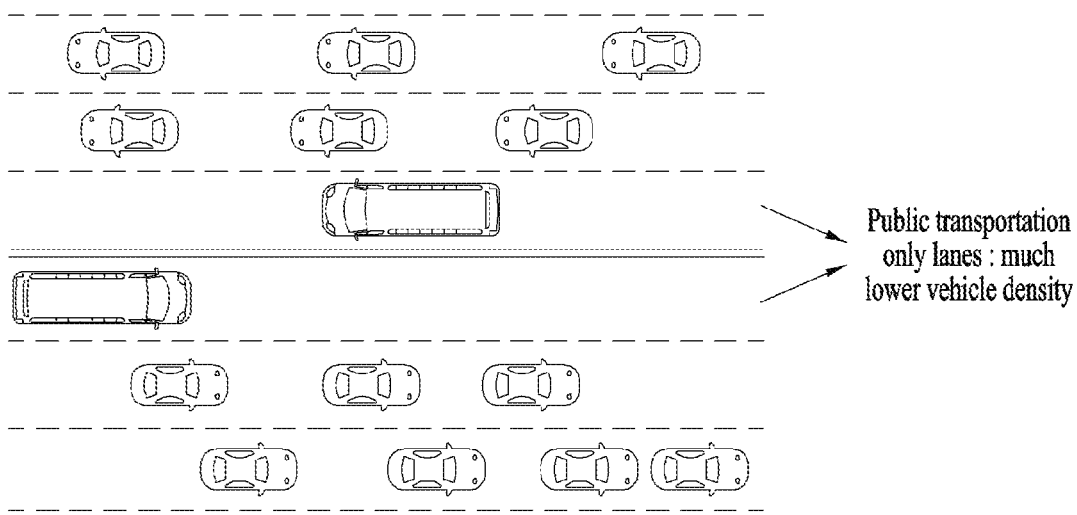
Figure 12:
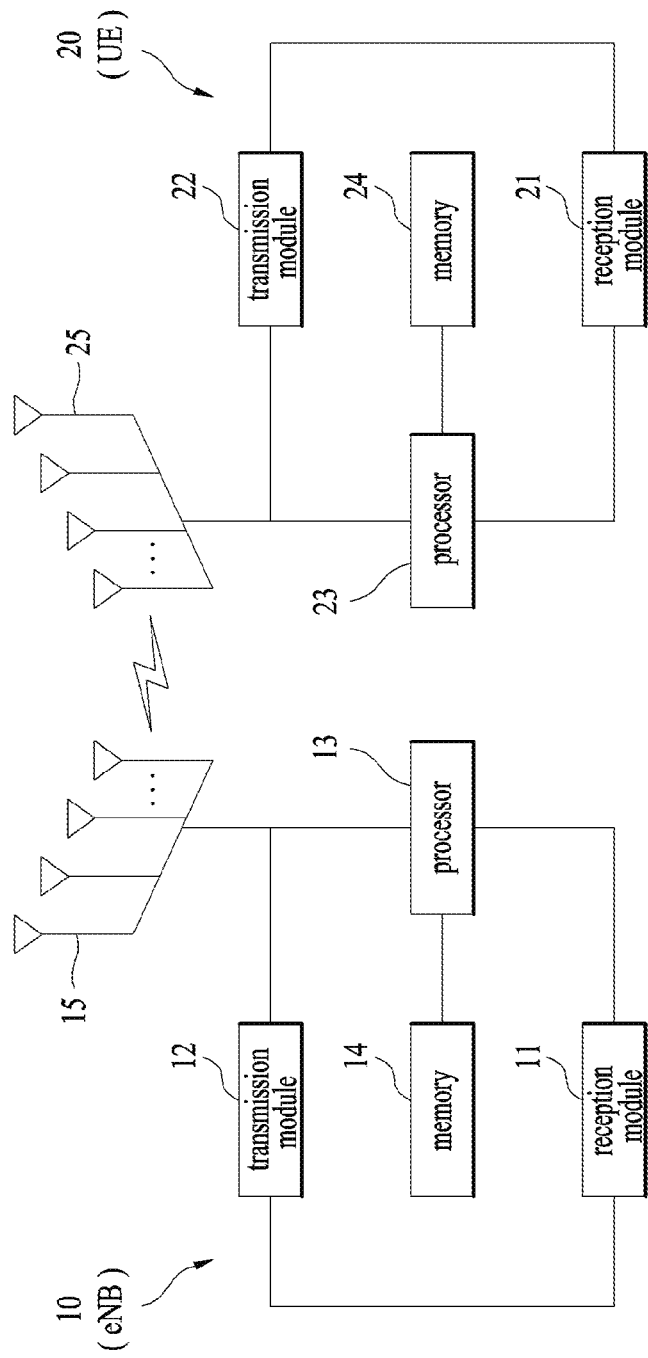
FIG. 12 is a diagram showing the configuration of a transmission and reception device.

If the lane information is acquired, a vehicle traveling in a specific lane may transmit or receive a signal in a resource region configured for the specific lane. FIG. 11 shows an example in which a first lane is set as a public transportation only lane. Referring to FIG. 11, a resource region in which vehicles traveling in the first lane transmit and receive signals and a resource region in which vehicles traveling in the other lanes transmit and receive signals may be divided, because the average speed of the vehicle traveling in the first lane and the average speed of the vehicle traveling in the other lane may be different.

Meanwhile, mobility increasing or decreasing in communication between vehicles may mean that a traffic jam occurs in the lane or on the road. At this time, if many UEs are present and all UEs perform transmission and reception, excessive signal transmission and reception may occur, thereby causing excessive interference. In addition, when the speeds of the UEs decrease, latency requirement may be relatively loose and thus a transmission period may be increased. In order to implement such a principle, all or some of a signal transmission period (or a message generation period), a transmission probability and a repetition number may be adjusted according to mobility of the UE. For example, the transmission period, the transmission probability and the repetition number may increase when the speed of the UE increases and decrease when the speed of the UE decreases. More specifically, consider that signals are transmitted and received at an interval of N ms. At this time, if the movement speed of the UE is in a range of A km/h to B km/h and signals are configured to be transmitted in a resource region at a period of N ms, signals may be configured to be transmitted and received at a period of N1 (=2*N) ms, which is greater than the transmission period N, when the speed of the UE decreases. According to this method, as the movement speed of the UE decreases, the speeds of the neighboring vehicles may decrease and an average interval between vehicles decreases, thereby increasing contention in this region. Therefore, the transmission period of the signal may be increased to reduce contention. A signal transmission probability may be adjusted using other methods. For example, if the movement speed of the UE is equal to or less than a predetermined threshold, the transmission probability may be decreased to reduce contention.

Meanwhile, a vehicle may include multiple antennas mounted therein. For example, antennas are mounted in left and right doors and an antenna having a protruding shape (having a shark-fin shape) may be formed on the roof of a vehicle. At this time, the properties of the wireless channel may be remarkably changed according to the position of the antenna of the vehicle. For example, the channel properties of the antennas mounted in the left and right doors may be remarkably different from those of other vehicles or other UEs. In addition, the antenna formed on the roof of the vehicle is used to perform communication with infrastructure and the antennas mounted in the doors may be used for high-speed communication between vehicles traveling in the same direction such as measurement of a distance from another vehicle or lane level positioning.

At this time, a separate resource region (time or frequency) may be used according to usage of the antenna. In this method, since several antennas are mounted in a vehicle, one UE is considered as being used from the viewpoint of a cellular network, but resource regions which differ according to antenna may be used, such that maximally common channel properties are provided in the regions, thereby reducing detection complexity of a receiver. In another implementation method, a UE ID may be assigned according to antenna or usage of the antenna to regard a vehicle as having a plurality of UEs mounted therein. At this time, a rule for assigning a usage index to each UE and using a separate resource region according to the usage index may be set.

Meanwhile, all or some of the proposed methods may be used for direct link between UEs, such as D2D or V2V or may be used when UEs transmit signals to fixed infrastructure (an eNB or an RSU) (UL or DL), such as V2I. For example, when UEs having different mobility or heading transmit signals to infrastructure in the same resource region, ICI is generated between the UEs and implementation of an eNB for detecting each packet may become complicated. However, if a resource region is divided according to mobility or heading, a common mobility component may be predicted in the resource region such that the eNB applies a common filter in the resource region, thereby improving performance or decreasing detection complexity. On DL, if it is assumed that UEs having high mobility perform reception in the common resource region, methods of applying more random beamforming to transmission in the region or applying pre-distortion in order to attenuate a common Doppler component may be considered.

In the above description, if the movement speed is used as a criterion for allocating/selecting a resource pool, the movement speed may be the movement speed of a UE or an average of the movement speeds of UEs located near the UE. When transmission parameters (all or some of a transmission period, a probability, a repetition number, transmit power, a channel (energy or reference signal) sensing threshold and channel occupancy time window adaptation) are adjusted according to the movement speed of the UE, the UE cannot recognize whether the transmission parameters are adjusted due to congestion or whether a driver decreases the speed of the vehicle regardless of congestion, when adjusting the transmission parameters using the speed thereof. Accordingly, when the UE determines the transmission parameters using the movement speed thereof, a network or an RSU may signal a transmission determination value according to the average movement or movement speeds of neighboring UEs or the UE may average the movement speeds of the neighboring UEs and determine the transmission parameters. To this end, in the message transmitted by the UE of the vehicle, a movement speed may be included in a physical layer signal or a higher layer signal and a field indicating the transmission parameter according to the movement speed of the UE may be included in the physical layer signal or the higher layer signal. The UE of the vehicle may determine the transmission parameters in consideration of the messages received from the neighboring UEs and the movement speed thereof.

The examples of the above-proposed methods may be included in one of the implementation methods of the present invention and may be regarded as proposed methods. In addition, the above-proposed methods may be independently implemented and some of the above-proposed methods may be combined (merged). A rule may be defined such that an eNB signals information regarding whether the proposed methods are applied (information regarding the rules of the above-proposed methods) to a UE through a predefined signal (e.g., a physical layer signal or a higher layer signal).

Configuration of Device According to Embodiment of the Present Invention

FIG. 13 is a diagram showing the configuration of a transmission point device and a UE device.

Referring to FIG. 13, the transmission point device 10 according to the present invention may include a reception module 11, a transmission module 12, a processor 13, a memory 14 and a plurality of antennas 15. Since the plurality of antennas 15 is used, the transmission point device may support MIMO transmission/reception. The reception module 11 may receive a variety of signals, data and information from the UE on uplink. The transmission module 12 may transmit a variety of signals, data and information to the UE on downlink. The processor 13 may control the overall operation of the transmission point device 10.

The processor 13 of the transmission point device 10 according to one embodiment of the present invention may process operations necessary for the above-described embodiments.

The processor 13 of the transmission point device 10 may process information received by the transmission point device 10 and information to be transmitted to an external device and the memory 14 may store the processed information for a predetermined time and may be replaced by a component such as a buffer (not shown).

Referring to FIG. 13, the UE device 20 according to the present invention may include a reception module 21, a transmission module 22, a processor 23, a memory 24 and a plurality of antennas 25. Since the plurality of antennas 25 is used, the UE device may support MIMO transmission/reception. The reception module 25 may receive a variety of signals, data and information from the eNB on downlink. The transmission module 22 may transmit a variety of signals, data and information to the eNB on uplink. The processor 23 may control the overall operation of the UE device 20.

The processor 23 of the UE device 20 according to one embodiment of the present invention may process operations necessary for the above-described embodiments.

The processor 23 of the UE device 20 may process information received by the UE device 20 and information to be transmitted to an external device and the memory 24 may store the processed information for a predetermined time and may be replaced by a component such as a buffer (not shown).

In the above-described detailed configuration of the transmission point device and the UE device, details of the above-described various embodiments of the present invention may be independently applied or 2 or more embodiments may be applied at the same time. In this case, overlapping details will be omitted from the description for simplicity and clarity.

Furthermore, in the description of FIG. 13, the description of the transmission point device 10 may also be equally applied to a device functioning as a downlink transmitter or an uplink receiver. The description of the UE device 20 may also be equally applied to a relay station device functioning as an uplink transmitter or a downlink receiver.

The embodiments of the present invention can be implemented by a variety of means, for example, hardware, firmware, software, or a combination thereof.

In the case of implementing the present invention by hardware, the present invention can be implemented with application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory unit so as to be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Additionally, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

INDUSTRIAL APPLICABILITY

The above-described embodiments of the present invention are applicable to various mobile communication systems.

What is claimed is:

1. A method, performed at a user equipment (UE) in a wireless communication system, the method comprising:
    selecting a resource pool based on at least one measurement information;
    determining a number of repetitive transmissions of a PSSCH (Physical sidelink shared channel) based on a movement speed of the UE included in the at least one measurement information; and
    transmitting the PSSCH to a neighboring UE in the selected resource pool based on the determined number of repetitive transmissions of the PSSCH,
    wherein the number of repetitive transmissions of the PSSCH is differently determined according to whether the movement speed of the UE is greater than a reference value.

2. The method according to claim 1,
    wherein the at least one measurement information is related to a geographical position of the UE.

3. The method according to claim 1,
    wherein the at least one measurement information includes movement direction information of the UE.

4. The method according to claim 3,
    wherein the movement direction information of the UE is measured by a sensor or a global positioning system (GPS) of the UE.

5. The method according to claim 4,
    wherein the movement direction information of the UE is derived from change in cell ID.

6. The method according to claim 5,
    wherein the cell ID is identifier information for identifying a road side unit (RSU).

7. The method according to claim 1, wherein the at least one measurement information is an average of movement speeds of UEs located near the UE.

8. The method according to claim 7,
    wherein when the average of the movement speeds of the UEs located near the UE is less than a preset threshold value, the number of repetitive transmissions is reduced.

9. The method according to claim 7,
    wherein the movement speed is measured by a speed sensor of the UE.

10. The method according to claim 7, wherein the movement speed is determined by the number of times of detection of road side units (RSUs) each having a predetermined reference signal received power (RSRP) or more.

11. The method according to claim 1, wherein the UE transmits the PSSCH on predetermined time-frequency resources of the resource pool.

12. The method according to claim 3, wherein the resource pool is divided according to the movement direction information of the UE.

13. A user equipment (UE) for transmitting and receiving in a wireless communication system, the UE comprising:
    a transmitter and a receiver;
    a processor operatively coupled to the transmitter and the receiver,
    wherein the processor selects a resource pool based on at least one measurement information, determines a number of repetitive transmissions of a PSSCH (Physical sidelink shared channel) based on a movement speed of the UE included in the at least one measurement information, and transmits via the transmitter the PSSCH to a neighboring UE in the selected resource pool based on the determined the number of repetitive transmissions of the PSSCH, and
    wherein the number of repetitive transmissions of the PSSCH is differently determined according to whether the movement speed of the UE is greater than a reference value.

* * * * *